(12) United States Patent
Kapahi et al.

(10) Patent No.: US 8,213,174 B1
(45) Date of Patent: Jul. 3, 2012

(54) VIBRATION-DAMPING MOUNT

(75) Inventors: Reetesh Kapahi, Bangalore (IN); Nagaraj Ananthanarashima, Bangalore (IN); Kapil Jain, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 363 days.

(21) Appl. No.: 12/684,707

(22) Filed: Jan. 8, 2010

(51) Int. Cl.
*G06F 1/16* (2006.01)

(52) U.S. Cl. ............ 361/679.36; 361/679.33; 361/724; 361/759; 248/634; 248/636; 369/75.11

(58) Field of Classification Search ............ 361/679.34; 369/75.11
See application file for complete search history.

(56) References Cited

U.S. PATENT DOCUMENTS

| | | | |
|---|---|---|---|
| 4,821,368 A | 4/1989 | Albrecht | |
| 4,896,777 A | 1/1990 | Lewis | |
| 4,926,291 A | 5/1990 | Sarraf | |
| 4,937,806 A | 6/1990 | Babson et al. | |
| 5,004,207 A | 4/1991 | Ishikawa et al. | |
| 5,124,855 A | 6/1992 | Dew et al. | |
| 5,131,619 A * | 7/1992 | Daugherty et al. | 248/635 |
| 5,136,466 A | 8/1992 | Remise et al. | |
| 5,253,129 A | 10/1993 | Blackborow et al. | |
| 5,303,896 A * | 4/1994 | Sterka | 248/557 |
| 5,366,200 A | 11/1994 | Scura | |
| 5,402,308 A | 3/1995 | Koyanagi et al. | |
| 5,426,562 A | 6/1995 | Morehouse et al. | |
| 5,463,527 A | 10/1995 | Hager et al. | |
| 5,469,311 A | 11/1995 | Nishida et al. | |
| 5,491,608 A | 2/1996 | Koyanagi et al. | |
| 5,654,875 A | 8/1997 | Lawson | |
| 5,761,031 A | 6/1998 | Ajmani | |
| 5,808,866 A | 9/1998 | Porter | |
| 5,837,934 A | 11/1998 | Valavanis et al. | |
| 5,881,989 A * | 3/1999 | O'Brien et al. | 248/634 |
| 6,094,342 A | 7/2000 | Dague et al. | |
| 6,154,360 A | 11/2000 | Kaczeus, Sr. et al. | |
| 6,166,901 A | 12/2000 | Gamble et al. | |
| 6,304,440 B1 | 10/2001 | Lin | |
| 6,498,722 B1 | 12/2002 | Stolz et al. | |
| 6,501,644 B1 | 12/2002 | Silverman et al. | |
| 6,545,865 B2 | 4/2003 | Albrecht et al. | |
| 6,606,242 B2 | 8/2003 | Goodman et al. | |
| 6,690,539 B2 | 2/2004 | Gallo et al. | |
| 6,719,385 B1 | 4/2004 | Adams et al. | |
| 6,842,339 B2 * | 1/2005 | Lin et al. | 361/679.58 |
| 6,859,363 B1 | 2/2005 | Chuang | |
| 6,867,942 B2 | 3/2005 | Albrecht et al. | |
| 6,882,528 B2 | 4/2005 | Chuang | |
| 6,883,175 B2 * | 4/2005 | Liao et al. | 720/692 |

(Continued)

*Primary Examiner* — Anthony Q Edwards
(74) *Attorney, Agent, or Firm* — Shumaker & Sieffert, P.A.

(57) ABSTRACT

In an example, a vibration-damping mount comprises a bolt including a threaded shaft and a bolt head fixed to the threaded shaft, and a vibration-damping base. The vibration-damping base includes a head segment that envelops the bolt head and a neck segment adjacent to the head segment and opposite to the threaded shaft. The vibration-damping base further includes a rear segment adjacent to the neck segment and opposite to the head segment. The head segment, the neck segment and the rear segment combine to form a notch configured to mate with a hole in a mounting board, such as a printed circuit board. The vibration-damping mount may be suitable to mount a mass data storage device such as a hard disk drive to a printed circuit board in a chassis system and simultaneously isolate the mass data storage device from vibrations in the chassis system.

33 Claims, 6 Drawing Sheets

U.S. PATENT DOCUMENTS

| | | |
|---|---|---|
| 7,016,189 B2 | 3/2006 | Lin |
| 7,142,419 B2 | 11/2006 | Cochrane |
| 7,227,761 B2 * | 6/2007 | Estes et al. .................... 361/810 |
| 7,237,246 B2 * | 6/2007 | Chang ........................... 720/692 |
| 7,369,402 B2 | 5/2008 | Huang |
| 7,701,705 B1 * | 4/2010 | Szeremeta ............... 361/679.36 |
| 7,719,832 B2 * | 5/2010 | Kobara et al. ............ 361/679.58 |
| 8,050,055 B2 * | 11/2011 | Monda et al. .................. 361/807 |
| 8,117,628 B2 * | 2/2012 | Wu ................................ 720/651 |
| 2006/0139873 A1 * | 6/2006 | Tomizawa et al. ............ 361/685 |
| 2006/0261528 A1 | 11/2006 | Cheng et al. |
| 2010/0246147 A1 * | 9/2010 | Qin et al. ....................... 361/758 |

* cited by examiner

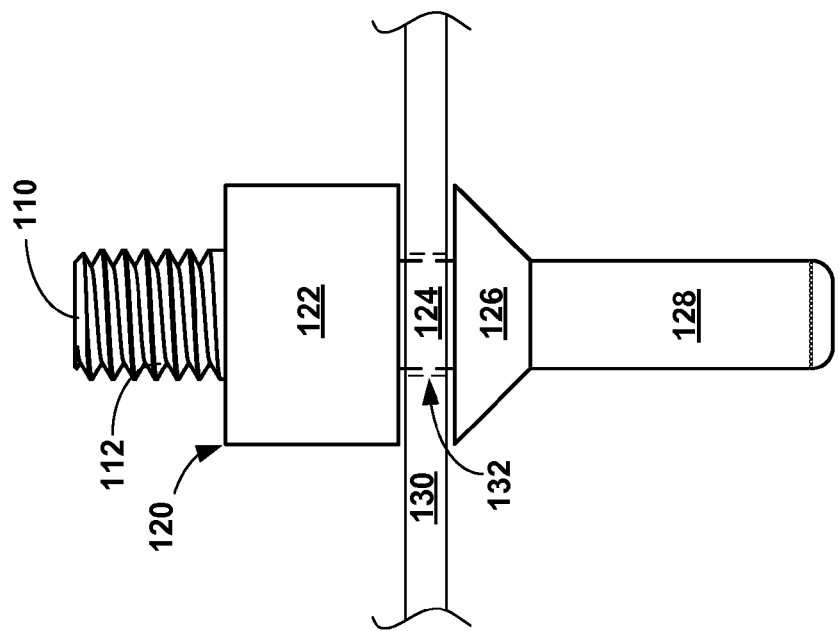
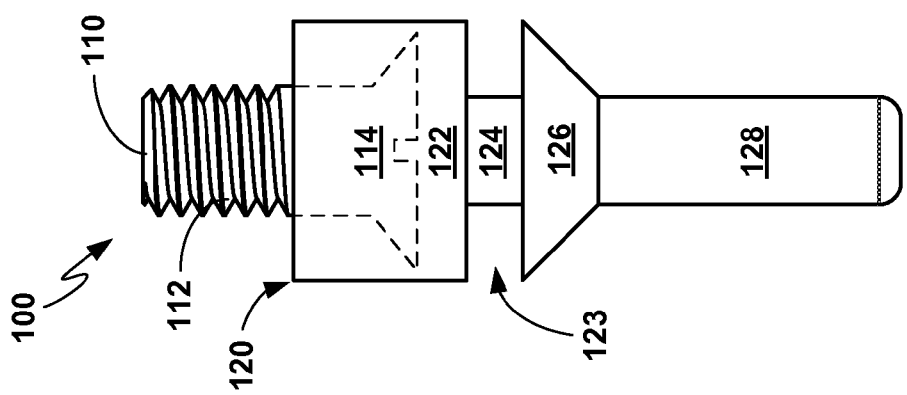
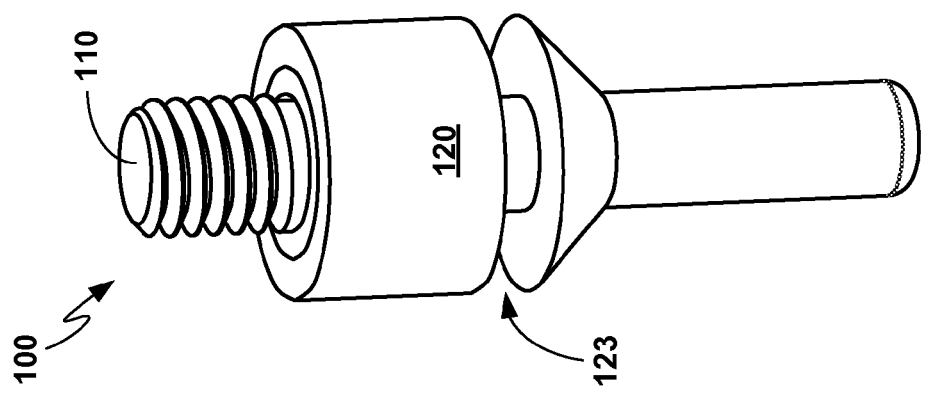

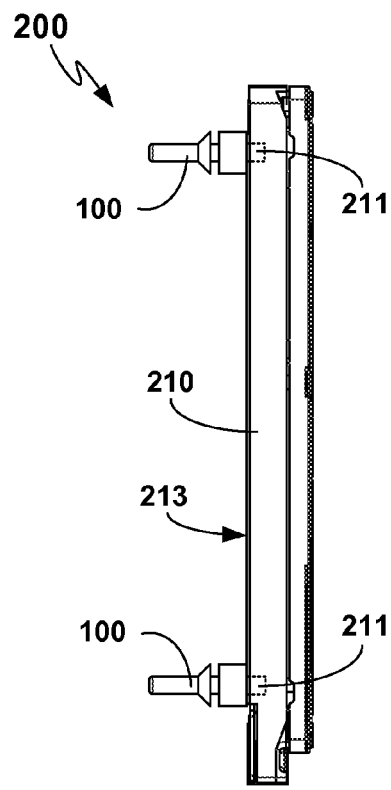
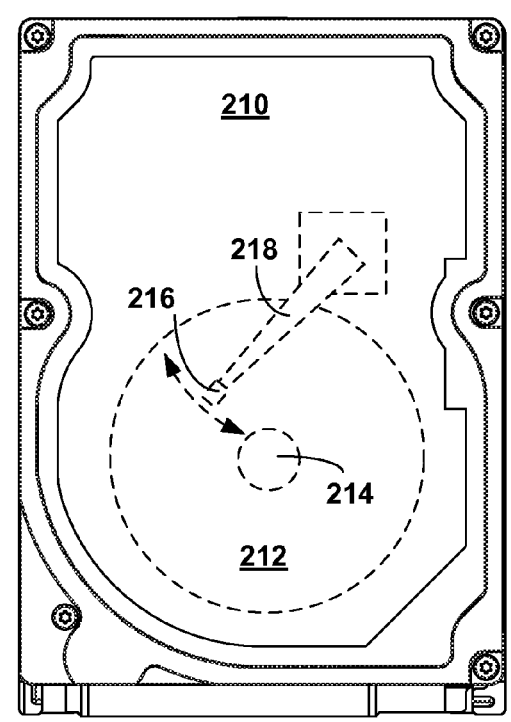
FIG. 4A  FIG. 4B
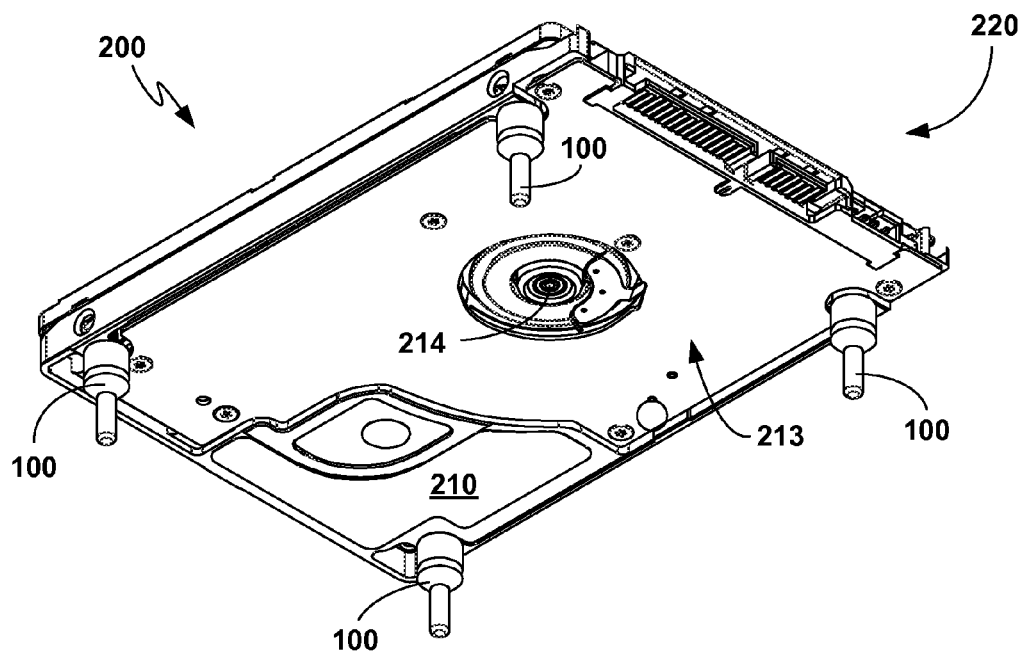
FIG. 4C

VIBRATION-DAMPING MOUNT

TECHNICAL FIELD

The invention relates to mounting techniques that dampen vibrations.

BACKGROUND

Electronic devices may be used in many types of systems and/or applications, such as control systems, data processing systems, medical systems, telecommunication systems and/or communication networks. Electronic devices may include system controllers, servers and/or data acquisition systems, medical imaging systems, central office systems, and/or network devices, such as routers, switches, firewalls, and/or network address translators.

Many electronic devices, including those mentioned above, may include mass data storage devices such as hard disk drives (HDDs). HDDs store and retrieve information from one or more rotating recordable disks using heads mounted on actuator arms. While vibration can cause undesirable effects on a wide variety of electronic components, the mechanical operation of HDDs makes such devices particularly susceptible to performance degradation caused by vibrations.

SUMMARY

In general, the invention is directed to techniques that include a vibration-damping mount with a shaft and a vibration-damping base that isolates the shaft and any electronic component connected thereto from vibrations experienced by another component secured to the vibration-damping base. The vibration-damping base is configured to fit within a hole of a mounting board. The shaft extends from the vibration-damping base, but not through the hole of the mounting board. In one example, the mounting board may be a printed circuit board with a set of holes for mounting an HDD. The shafts of a corresponding number of vibration-damping mounts are threaded into screw holes in the HDD housing and the vibration-damping bases are mounted within the holes of the printed circuit board (PCB). In this manner, an HDD can be mounted to a PCB in a manner that isolates the HDD from vibrations experienced by the PCB.

In one embodiment, a vibration-damping mount comprises a bolt including a threaded shaft and a bolt head fixed to the threaded shaft and a vibration-damping base. The vibration-damping base includes a head segment that envelops the bolt head, a neck segment adjacent to the head segment and opposite to the threaded shaft, and a rear segment adjacent to the neck segment and opposite to the head segment. The neck segment has a cross-sectional thickness smaller than a cross-sectional thickness of the head segment. The rear segment has a cross-sectional thickness larger than the cross-sectional thickness of the neck segment. The head segment, the neck segment and the rear segment combine to form a notch configured to mate with a hole in a mounting board such that at least a portion of the neck segment is within the hole and the head segment and the rear segment are on either side of the mounting board.

In another embodiment, an assembly comprises a mass data storage device including a rewriteable memory, and a housing encasing the rewriteable memory. The assembly further comprises a set of vibration-damping mounts mounted to an external surface of the housing. Each of the vibration-damping mounts includes a shaft mounted to the external surface of the housing, the shaft including a shaft head opposite the housing, and a vibration-damping base. The vibration-damping bases include a head segment that envelops the shaft head, a neck segment adjacent to the head segment and opposite to the shaft, and a rear segment adjacent to the neck segment and opposite to the head segment. The neck segment has a cross-sectional thickness smaller than a cross-sectional thickness of the head segment. The rear segment has a cross-sectional thickness larger than the cross-sectional thickness of the neck segment. The head segment, the neck segment and the rear segment combine to form a notch configured to mate with a hole in a mounting board such that at least a portion of the neck segment is within the hole and the head segment and the rear segment are on either side of the mounting board.

In an additional embodiment, an assembly comprises a chassis, one or more cooling fans mounted to the chassis, a printed circuit board mounted within the chassis, a mass data storage device. The printed circuit board forms a set of mounting holes. The mass data storage device includes a rewriteable memory, and a housing encasing the rewriteable memory. The assembly further comprises a set of vibration-damping mounts mounted to an external surface of the housing of the mass data storage device. Each of the vibration-damping mounts includes a shaft mounted to the external surface of the housing, the shaft including a shaft head opposite the housing, and a vibration-damping base. The vibration-damping bases include a head segment that envelops the shaft head, a neck segment adjacent to the head segment and opposite to the shaft, and a rear segment adjacent to the neck segment and opposite to the head segment. The neck segment has a cross-sectional thickness smaller than a cross-sectional thickness of the head segment. The rear segment has a cross-sectional thickness larger than the cross-sectional thickness of the neck segment. The head segment, the neck segment and the rear segment combine to form a notch mated with a corresponding mounting hole in the printed circuit board such that at least a portion of the neck segment is within the corresponding mounting hole and the head segment and the rear segment are on either side of the printed circuit board.

In another embodiment, a method of mounting a mass storage device comprises attaching a set of vibration-damping mounts to an external surface of a housing of the mass data storage device such that each of the vibration-damping mounts extends in a common direction. Each of the vibration-damping mounts includes a shaft mounted to the external surface of the housing, the shaft including a shaft head opposite the housing, and a vibration-damping base. The vibration-damping base includes a head segment that envelops the shaft head, a neck segment adjacent to the head segment and opposite to the shaft, and a rear segment adjacent to the neck segment and opposite to the head segment. The neck segment has a cross-sectional thickness smaller than a cross-sectional thickness of the head segment, and the rear segment has a cross-sectional thickness larger than the cross-sectional thickness of the neck segment. The head segment, the neck segment and the rear segment combine to form a notch configured to mate with a hole in a mounting board. The method further comprises, for each of the vibration-damping mounts, forcing the rear segment through a corresponding hole in a set of holes in the mounting board such that at least a portion of the neck segment is within the corresponding hole and the head segment and the rear segment are on either side of the mounting board.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 1A and 1B illustrate a vibration-damping mount including a bolt with a screw head.

FIG. 1C illustrates the vibration-damping mount of FIGS. 1A and 1B mated with a hole in a mounting board.

FIGS. 4A-4C illustrate an assembly including a set of vibration-damping mounts mounted to a mass data storage device.

DETAILED DESCRIPTION

Figure 2:
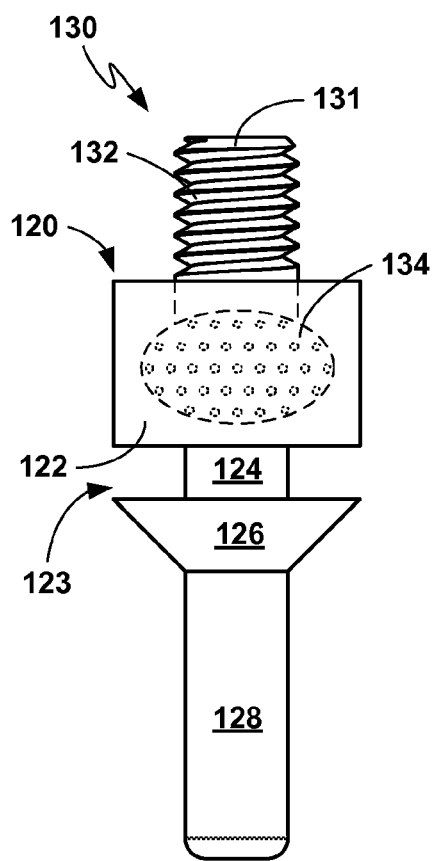
FIG. 2 illustrates a vibration-damping mount including a bolt with a textured spherical head.

FIGS. 1A and 1B illustrate vibration-damping mount 100. FIG. 1C illustrates vibration-damping mount 100 mated with hole 132 in mounting board 130. Vibration-damping mount 100 includes bolt 110 and vibration-damping base 120. Vibration-damping base 120 forms annular notch 123 for securing vibration-damping mount 100 in a hole of a mounting board. As discussed in further detail below, the configuration of vibration-damping mount 100 serves to limit the transmission of vibrations between bolt 110 and mounting board 130. For example, no portion of bolt 110 is within hole 132 when vibration-damping mount 100 is installed in hole 132 and bolt 110 is completely separated from mounting board 130 by vibration-damping base 120.

Bolt 110 includes threaded shaft 112 and bolt head 114 fixed to threaded shaft 112. Threaded shaft 112 is a shaft suitable for mounting vibration-damping mount 100 within a threaded hole of a device housing, such as an HDD. In other examples, vibration-damping mount 100 may be secured using other techniques, including but not limited to, gluing, welding, press-fit, etc. In such examples, the shaft of the vibration-damping mount may not be a threaded shaft. As shown in FIG. 1B, bolt head 114 is a screw head, such as a Phillips screw head, a flathead screw head, a hex-head or other screw head. In some examples, bolt 110 may be a common machine screw. Bolt 110 may be formed from, for example, steel, stainless steel, aluminum or other metal.

Vibration-damping base 120 includes head segment 122, neck segment 124, rear segment 126, and tail segment 128. Bolt head 114 is enveloped within head segment 122 of vibration-damping base 120. This secures bolt 110 to vibration-damping base 120. Neck segment 124 is adjacent to head segment 122 opposite threaded shaft 110. Neck segment 124 has a cross-sectional thickness smaller than a cross-sectional thickness of head segment 122. Rear segment 126 is adjacent to neck segment 124 opposite to head segment 122. Rear segment 126 has a cross-sectional thickness larger than the cross-sectional thickness of neck segment 124.

Head segment 122, neck segment 124 and rear segment 126 combine to form annular notch 123. As shown in FIG. 1C, annular notch 123 is configured to mate with a hole in a mounting board, e.g., hole 132 of mounting board 130, such that at least a portion of the neck segment 124 is within the hole and head segment 122 and rear segment 126 are on either side of the mounting board. In some examples, the width of annular notch 123 may be slightly smaller than the thickness of the mounting board such that the mounting board is pinched between head segment 122 and rear segment 126. Additionally, in some examples, the diameter of neck segment 124 is slightly larger than the hole in the mounting board such that the neck segment is compressed by the hole. The configuration of vibration-damping mount 100 ensures that no portion of bolt 110 comes in contact with the mounting board. Instead, vibration-damping base 120 is interposed between bolt 110 and the mounting board to completely isolate the bolt from the board. Vibration-damping mount 100 can provide additional damping as compared to a configuration where a bolt extends through a hole in a mounting board. For example, the thickness of head segment 122 that extends beyond bolt head 114 can be adjusted according to desired damping characteristics. In addition, the material of vibration-damping base 120 is not compressed between bolt 110 and a mounting board, which means the damping characteristics of vibration-damping mount 100 are not significantly altered by the force used to screw vibration-damping mount 100 into a device.

As previously mentioned, vibration-damping base 120 also includes tail segment 128. Tail segment 128 does not significantly affect the damping characteristics of vibration-damping mount 100, but is instead used to simplify installation of vibration-damping mount 100 in a mounting board. Tail segment 128 is adjacent to rear segment 126 opposite neck segment 124. Tail segment 128 has a cross-sectional thickness smaller than the cross-sectional thickness of head segment 122. For example, the cross-sectional thickness of tail segment 128 may be about the same as the cross-sectional thickness of neck segment 124. As another example, the cross-sectional thickness of neck segment 124 may be approximately equal to or greater than the diameter of hole 132 in mounting board 130, and the cross-sectional thickness of tail segment 128 may be less than the diameter of hole 132. As examples, the cross-sectional thickness of tail segment 128 may be in a range from 1 to 0.5 times the diameter of hole 132.

The cross-sectional thickness of rear segment 126 tapers from annular notch 123 such that rear segment 126 is thicker adjacent annular notch 123 than from the end of the rear segment adjacent tail 128. The tapered configuration of rear segment 126 allows rear segment 126 to be pulled through hole 132 by tail segment 128 to mount vibration-damping mount 100 within hole 132 in mounting board 130.

Vibration-damping base 120 is formed from an elastic material and may be, e.g., overmolded on bolt 110. The dimensions and material of vibration-damping base 120 can be selected to produce the desired damping characteristics of vibration-damping base 120. As examples, vibration-damping base 120 can be formed from natural rubber, synthetic rubber, polyvinyl chlorides (PVC), poloyolefin synthetic rubbers such as butyl rubber, ethylene propylene diene monomer (EPDM), styrene-butadiene rubbers, neoprene rubbers, nitrile rubbers, isoprene rubbers, polysulfide rubbers, chloroprenes, propylene, urethane rubbers, silicone rubbers and combinations thereof. Other rubber-like materials such as, for example, uncrosslinked thermoplastics like TPO rubbers, may also be used.

FIG. 2 illustrates vibration-damping mount 130, which illustrates an alternative configuration to vibration-damping mount 100 of FIGS. 1A-1C. Vibration-damping mount 130 includes bolt 131 and vibration-damping base 120. Vibration-damping mount 130 is substantially similar to vibration-damping mount 100 except that bolt 131 includes bolt head 134, which is configured as a textured sphere fixed to threaded shaft 132. For brevity, details of vibration-damping mount 130 that are the same or similar to those already discussed with respect to vibration-damping mount 100 are discussed in limited or no detail with respect to vibration-damping mount 130.

As with vibration-damping mount 100, vibration-damping base 120 of vibration-damping mount 130 forms annular notch 123 for securing vibration-damping mount 100 in a hole of a mounting board. Likewise, vibration-damping base 120 may be an overmold on bolt 131. Bolt head 134 may provide for a more robust connection between bolt 131 and vibration-damping base 120 than with bolt 110 and vibration-damping base 120 in vibration-damping mount 100. However, as also demonstrated with vibration-damping mount 140 of FIG. 3, many different bolt head configurations are suitable for use in a vibration-damping mount.

Figure 3:
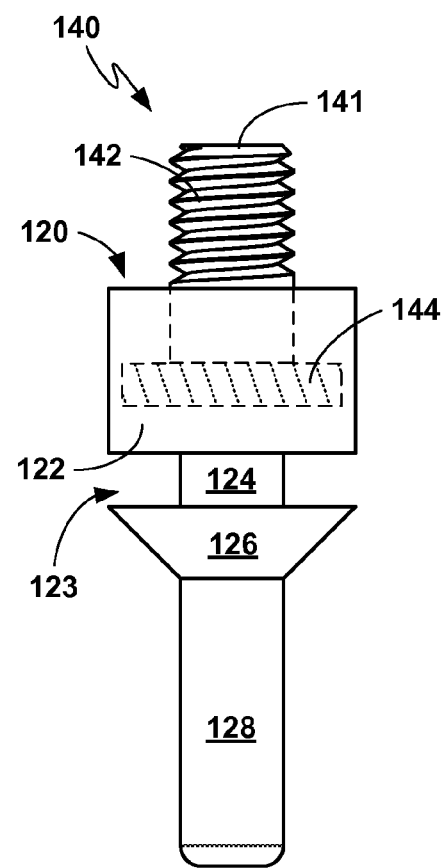
FIG. 3 illustrates a vibration-damping mount including a bolt with a thumb-screw head.

FIG. 3 illustrates vibration-damping mount 140, which illustrates another alternative configuration to vibration-damping mount 100 of FIGS. 1A-1C. Vibration-damping mount 140 includes bolt 141 and vibration-damping base 120. Vibration-damping mount 140 is substantially similar to vibration-damping mount 100 except that bolt 141 includes bolt head 144, which is configured as a thumb-screw head, fixed to threaded shaft 142. For brevity, details of vibration-damping mount 140 that are the same or similar to those already discussed with respect to vibration-damping mount 100 are discussed in limited or no detail with respect to vibration-damping mount 140.

As with vibration-damping mount 100, vibration-damping base 120 of vibration-damping mount 140 forms annular notch 123 for securing vibration-damping mount 100 in a hole of a mounting board. Likewise, vibration-damping base 120 may be an overmold on bolt 141. Bolt head 144 may provide for a more robust connection between bolt 141 and vibration-damping base 120 than with bolt 110 and vibration-damping base 120 in vibration-damping mount 100. However, the configurations of bolt heads 114, 134 and 144 are merely exemplary as other bolt head configurations are also suitable for use in a vibration-damping mounts. In addition, the bolt heads can also be referred to as shaft heads in that the same bolt head configurations can be used in vibration-damping mounts with shafts not including threads.

FIGS. 4A-4C illustrate assembly 200, which includes a set of vibration-damping mounts 100 mounted to mass data storage device 210. In the example of FIGS. 4A-4C, mass data storage device 210 is an HDD including spindle motor 214, rewriteable data storage disk 212, read/write head 216, actuator arm 218, and connector array 220. In other examples, mass data storage device may be a solid state mass data storage device.

In FIGS. 4A-4C, spindle motor 214 rotates rewriteable data storage disk 212. Read/write head 216 is mounted on actuator arm 218, which operates to position read/write head 216 adjacent different tracks on data storage disk 212. As an example, actuator arm 218 may be driven by a voice coil motor. Connector array 220 facilitates communications between mass data storage device 210 and a host device. As shown, connector array 220 is configured according to a Serial Advanced Technology Attachment (SATA) standard. In other embodiments, connector array may be configured according to different standards, such as integrated drive electronics (IDE) standards, Small Computer System Interface (SCSI) standards, and Serial Attached SCSI (SAS) standards, Universal Serial Bus (USB) standards, IEEE-1394 (Firewire) standards, Fiber Channel (FC) standards, Internet SCSI (iSCSI) standards and External SATA (eSATA) standards.

As discussed with respect to FIGS. 1A-1C, vibration-damping mounts 100 include threaded shafts 112 of bolts 110 that screw into threaded holes 211 of mass data storage device 210 to fasten vibration-damping mounts 100 to bottom external surface 213 of the mass data storage device 210 housing. In other examples, vibration-damping mounts may be secured to device 210 using other techniques, including but not limited to, gluing, welding, press-fit, etc. As shown in FIG. 4C, assembly 200 includes four vibration-damping mounts 100. Each of vibration-damping mounts 100 extends in a common direction. This allows, e.g., mass data storage device 210 to be mounted to an array of mounting holes in a substantially flat mounting board.

Figure 5:
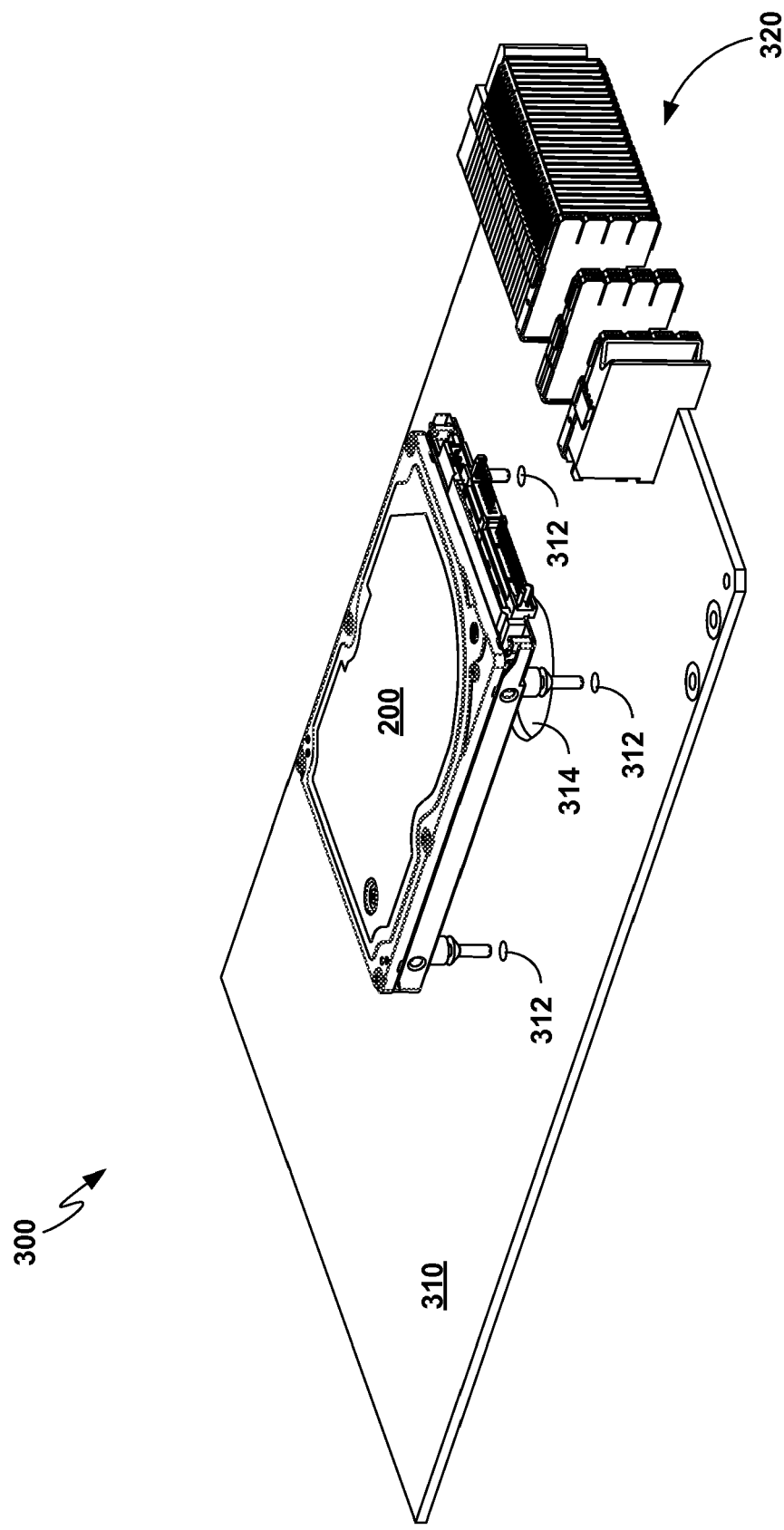
FIG. 5 illustrates an assembly including a set of vibration-damping mounts mounted to a mass data storage device and positioned to secure the mass data storage device to a set of mounting holes in a mounting board.

FIG. 5 illustrates assembly 300, which includes assembly 200 (FIG. 4) and PCB 310, which serves as a mounting board for assembly 200. As discussed with respect to FIG. 4, assembly 200 includes mass data storage device 210 and four vibration-damping mounts 100, which are fastened to and extend in a common direction from bottom external surface 213 of the housing of mass data storage device 210.

PCB 310 includes a set of mounting holes 312 and connector array 314. Mounting holes 312 are located on PCB 310 to mate with the four vibration-damping mounts 100 extending from mass data storage device 210 of assembly 200. Connector array 320 is for forming an electrical connection between PCB 310 and a host device. As an example, PCB 310 may be received in a card slot of the host device.

Mounting mass data storage device 210 on PCB 310 includes mounting the four vibration-damping mounts 100 to mass data storage device 210 by threading shafts 112 of bolts 110 of vibration-damping mounts 100 into threaded holes 211 on bottom external surface 213 of the housing of mass data storage device 210 to create assembly 200. Assembly 200 is then positioned over PCB 310 such that tail sections 128 (FIGS. 1A-1C) may be inserted through mounting holes 312. Then the rear sections 126 of vibration-damping mounts 100 can be pulled through mounting holes 312 by pulling on tail sections 128. This mates each vibration-damping mount 100 in the corresponding mounting hole 312 by arranging rear section 126 and head section 124 on either side of PCB 310 and neck section in hole 312.

PCB 310 also includes hole 316, which is adjacent to spindle motor 214 when mass data storage 210 is mounted to PCB 312. Hole 316 allows a cooling airflow to pass over mass data storage 210 adjacent spindle motor 214 as well as limits electrical interference between spindle motor 214 and PCB 310.

Figure 6:
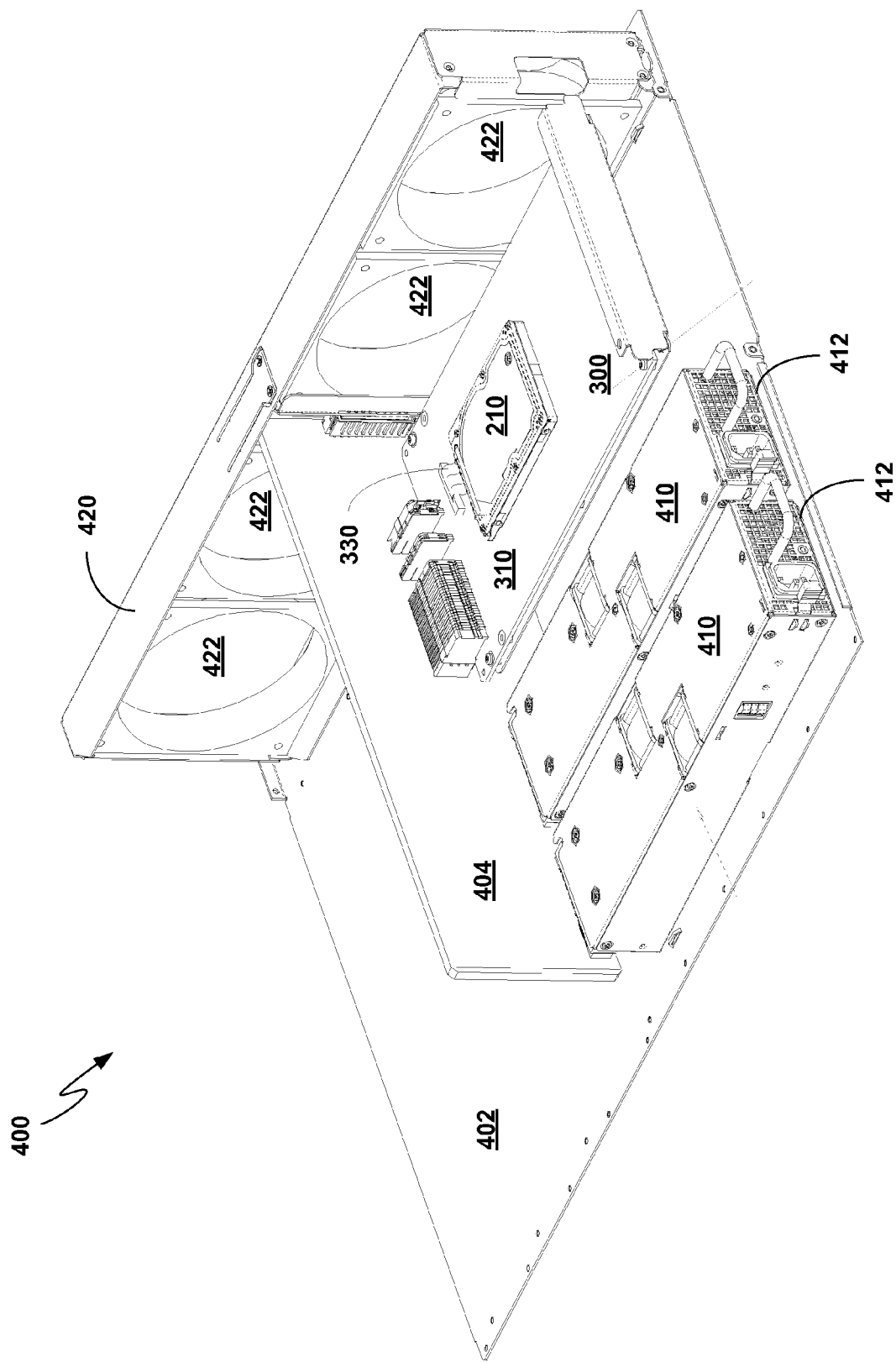
FIG. 6 illustrates an assembly including a mass data storage device mounted with a set of vibration-damping mounts to a printed circuit board in a chassis including power supplies and cooling fans.

FIG. 6 illustrates assembly 400, which includes assembly 300 with mass data storage device 210 mounted using a set of vibration-damping mounts 100 to PCB 310. Assembly 400 is part of a rack system and includes chassis 402, assembly 300 mounted within chassis 402, board 404, power supplies 410, and fan tray 420. Board 404 provides an electrical connection between the electronic components within chassis 402, including PCB 310, power supplies 410 and fan tray 420. As an example, board 404 may be a PCB.

Power supplies 410 include cooling fans 412 which can create vibrations that could interfere with the operation of mass data storage device 210. In addition, fan tray 420 includes annuluses 422 configured to receive additional cooling fans. Such fans can also create vibrations that could interfere with the operation of mass data storage device 210. However, because mass data storage device 210 is mounted to PCB 310 using vibration-damping mounts 100, mass data storage device 210 is largely isolated from vibrations in chassis 402, including vibrations caused by power supply cooling fans 412, fans received in annuluses 422 and any other vibrations in chassis 402. Other vibrations may come from, for example, additional chassis loaded in a rack system along with chassis 402, or even vibrations caused by the installation and/or removal of components in the rack system.

The electrical connection between mass data storage device 210 and PCB 310 further limits the transfer of vibrations between PCB 310 and mass data storage device 210. Specifically, mass data storage device 210 is connected to PCB 310 using SATA cable 330. In comparison, a configuration in which mass data storage device 210 were directly connected to a SATA connector soldered to PCB 310 would allow vibrations to transfer from PCB 310 to mass data storage device 210 via connector array 220 (FIG. 4C).

Figure 7:
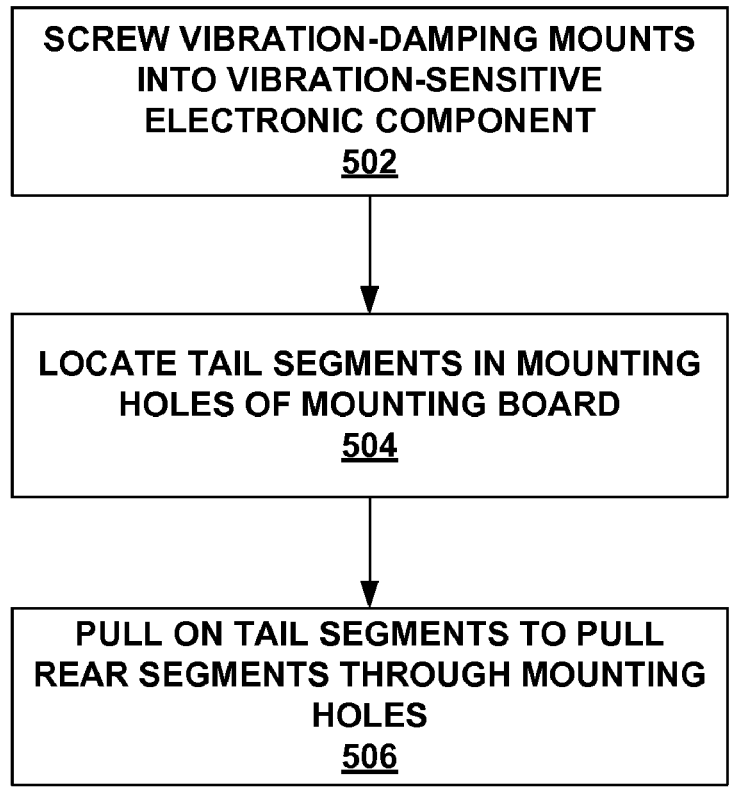
FIG. 7 is a flowchart illustrating techniques for mounting a mass data storage device to a set of mounting holes in a mounting board using a set of vibration-damping mounts.

FIG. 7 is a flowchart illustrating example techniques for mounting a mass data storage device to a set of mounting holes in a mounting board using a set of vibration-damping mounts. For clarity, the techniques illustrated in FIG. 7 are discussed with respect to vibration-damping mount 100 (FIGS. 1A-1C), assembly 200 (FIGS. 4A-4C) and assembly 300 (FIG. 5).

As represented in FIG. 7, a technician screws vibration-damping mounts 100 into threaded holes in an external housing of a vibration sensitive electronic component, such as mass data storage device 210 (502). As shown in FIG. 4A, vibration-damping mounts 100 can be screwed into threaded holes 211 in bottom external surface 213 of mass data storage device 210 such that vibration-damping mounts 100 extend in a common direction. While mass data storage device 210 itself is a vibration-sensitive component, in other examples, vibration-damping mounts 100 can instead be used to isolate a component that causes vibration from all other components in an assembly.

The technician positions assembly 200 adjacent PCB 310, which serves as a mounting board. As shown in FIG. 5, assembly 200 is located above PCB 310 such that tail segments 128 are located adjacent to corresponding mounting holes 312. Then the technician moves assembly 200 towards PCB 310 such that tail segments 128 pass through their corresponding mounting holes 312 (504).

Finally, the technician pulls on each of tail segments 128 to force rear segments 126 through mounting holes 312 so that vibration-damping mounts 100 are mated to the mounting holes 312 (506). Alternatively, the technician could push directly on rear segments 126 to force rear segments 126 through mounting holes 312. Additionally, the technician could push on the top of mass data storage device 210 to force rear segments 126 through mounting holes 312. When mated to a corresponding mounting hole 312, annular notch 123 of vibration damping mount 100 is coincident with mounting hole 312 such that at least a portion of the neck segment 124 is within the hole and head segment 122 and rear segment 126 are on either side of PCB 310. In addition, when device 210 is thus connected to PCB 210 by vibration-damping mount 100 mated to mounting hole 312, no portion of bolt 110 is within mounting hole 312. The configuration of vibration-damping mounts 100 therefore ensures that bolt 110 is always isolated from PCB 310 and vibrations borne there from by vibration-damping base 120.

Figure 8:
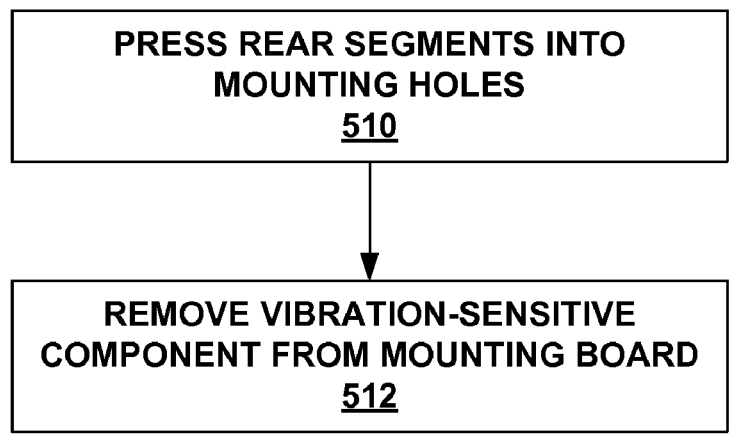
FIG. 8 is a flowchart illustrating techniques for removing a mass data storage device mounted with a set of vibration-damping mounts to a set of mounting holes in a mounting board from the mounting board.

FIG. 8 is a flowchart illustrating techniques for removing a device mounted with a set of vibration-damping mounts to a set of mounting holes in a mounting board from the mounting board. For clarity, the techniques illustrated in FIG. 8 are discussed with respect to vibration-damping mount 100 (FIGS. 1A-1C), assembly 200 (FIGS. 4A-4C) and assembly 300 (FIG. 5).

To remove assembly 200 from PCB 310, a technician simply separates each vibration-damping mount 100 from its corresponding mounting hole 312. Specifically, the technician presses rear segments 126 of each vibration-damping mount 100 through its corresponding mounting hole 312 (510). Then the technician lifts assembly 200 from PCB 310 to pull vibration-damping mounts 100 from mounting holes 312 (512). If desired, the technician may also remove vibration-damping mounts 100 from mass data storage device 210 by unscrewing vibration-damping mounts 100 from threaded holes 211 in bottom external surface 213 of the housing of mass data storage device 210. If mass data storage device 210 is being removed for replacement, vibration-damping mounts 100 may be used for mounting the replacement mass data storage device to PCB 310.

Various embodiments of the invention have been described. These and other embodiments are within the scope of the following claims.

The invention claimed is:

1. A vibration-damping mount comprising:
    a bolt including a threaded shaft and a bolt head fixed to the threaded shaft; and
    a vibration-damping base including:
        a head segment that envelops the bolt head,
        a neck segment adjacent to the head segment and opposite to the threaded shaft, wherein the neck segment has a cross-sectional thickness smaller than a cross-sectional thickness of the head segment, and
        a rear segment adjacent to the neck segment and opposite to the head segment, wherein the rear segment has a cross-sectional thickness larger than the cross-sectional thickness of the neck segment,
        wherein the head segment, the neck segment and the rear segment combine to form a notch configured to mate with a hole in a mounting board such that at least a portion of the neck segment is within the hole and the head segment and the rear segment are on either side of the mounting board.

2. The vibration-damping mount of claim 1, wherein the cross-sectional thickness of the rear segment tapers from the notch such that the rear segment is thicker adjacent the notch than from an end of the rear segment opposite the notch.

3. The vibration-damping mount of claim 1, wherein the vibration-damping base further includes a tail segment adjacent to the rear segment and opposite to the neck segment, wherein the tail segment has a cross-sectional thickness smaller than the cross-sectional thickness of the head segment.

4. The vibration-damping mount of claim 3, wherein the cross-sectional thickness of the rear segment tapers from the notch to the tail segment such that the rear segment is thicker adjacent the notch than adjacent the tail segment.

5. The vibration-damping mount of claim 3, wherein the cross-sectional thickness of the tail segment is between 1 and 0.5 times the diameter of the hole in the mounting board.

6. The vibration-damping mount of claim 1, wherein the bolt is a metal bolt, and wherein the vibration-damping base is an overmold on the metal bolt.

7. The vibration-damping mount of claim 1, wherein the bolt head is one of a group consisting of:
a screw head;
a hex head;
a Phillips head;
a flat head;
a thumb-screw head; and
a textured sphere.

8. The vibration-damping mount of claim 1, wherein no portion of the bolt extends into the hole in the mounting board when the notch mates with the hole in the mounting board.

9. The vibration-damping mount of claim 1, wherein the notch in an annular notch.

10. An assembly comprising:
a mass data storage device including:
 a rewriteable memory, and
 a housing encasing the rewriteable memory; and
a set of vibration-damping mounts mounted to an external surface of the housing, wherein each of the vibration-damping mounts includes:
 a shaft mounted to the external surface of the housing, the shaft including a shaft head opposite the housing, and
 a vibration-damping base including:
  a head segment that envelops the shaft head,
  a neck segment adjacent to the head segment and opposite to the shaft, wherein the neck segment has a cross-sectional thickness smaller than a cross-sectional thickness of the head segment, and
  a rear segment adjacent to the neck segment and opposite to the head segment, wherein the rear segment has a cross-sectional thickness larger than the cross-sectional thickness of the neck segment,
  wherein the head segment, the neck segment and the rear segment combine to form a notch configured to mate with a hole in a mounting board such that at least a portion of the neck segment is within the hole and the head segment and the rear segment are on either side of the mounting board.

11. The assembly of claim 10, wherein the shafts each include a threaded shaft threaded into screw holes within housing to mount the vibration-damping mounts to the external surface of the housing.

12. The assembly of claim 10, wherein the set of vibration-damping mounts includes at least three vibration-damping mounts, wherein each of the three vibration-damping mounts extends from the housing in a common direction.

13. The assembly of claim 10, further comprising a printed circuit board forming a set of mounting holes and configured as the mounting board, wherein each of the set of vibration-damping mounts are mated with one of the set of mounting holes.

14. The assembly of claim 13, wherein, for each of the vibration-damping mounts, no portion of the shaft extends into the corresponding mounting hole in the printed circuit board.

15. The assembly of claim 10, wherein, for each of the vibration-damping mounts, the cross-sectional thickness of the rear segment tapers from the notch such that the rear segment is thicker adjacent the notch than from an end of the rear segment opposite the notch.

16. The assembly of claim 10, wherein, for each of the vibration-damping mounts, the shaft is a metal screw, and wherein the vibration-damping base is an overmold on the metal screw.

17. The assembly of claim 10, wherein, for each of the vibration-damping mounts, the notch is an annular notch.

18. The assembly of claim 10, wherein the mass data storage device is a hard disk drive (HDD).

19. An assembly comprising:
a chassis;
one or more cooling fans mounted to the chassis;
a printed circuit board mounted within the chassis, wherein the printed circuit board forms a set of mounting holes;
a mass data storage device including:
 a rewriteable memory, and
 a housing encasing the rewriteable memory; and
a set of vibration-damping mounts mounted to an external surface of the housing of the mass data storage device, wherein each of the vibration-damping mounts includes:
 a shaft mounted to the external surface of the housing, the shaft including a shaft head opposite the housing; and
 a vibration-damping base including:
  a head segment that envelops the shaft head,
  a neck segment adjacent to the head segment and opposite to the shaft, wherein the neck segment has a cross-sectional thickness smaller than a cross-sectional thickness of the head segment, and
  a rear segment adjacent to the neck segment and opposite to the head segment, wherein the rear segment has a cross-sectional thickness larger than the cross-sectional thickness of the neck segment,
  wherein the head segment, the neck segment and the rear segment combine to form a notch mated with a corresponding mounting hole in the printed circuit board such that at least a portion of the neck segment is within the corresponding mounting hole and the head segment and the rear segment are on either side of the printed circuit board.

20. The assembly of claim 19, further comprising a power supply mounted within the chassis, wherein the power supply includes at least one of the cooling fans.

21. The assembly of claim 19, wherein the shafts each include a threaded shaft threaded into screw holes within housing to mount the vibration-damping mounts to the external surface of the housing of the mass data storage device.

22. The assembly of claim 19, wherein the set of vibration-damping mounts includes at least three vibration-damping mounts, wherein each of the three vibration-damping mounts extends from the housing of the mass data storage device in a common direction in order to mate with the set of mounting holes in the printed circuit board.

23. The assembly of claim 19, wherein, for each of the vibration-damping mounts, no portion of the shaft extends into the corresponding mounting hole in the printed circuit board.

24. The assembly of claim 19, wherein, for each of the vibration-damping mounts, the cross-sectional thickness of the rear segment tapers from the notch such that the rear segment is thicker adjacent the notch than from an end of the rear segment opposite the notch.

25. The assembly of claim 19, wherein, for each of the vibration-damping mounts, the shaft is a metal screw, and wherein the vibration-damping base is an overmold on the metal screw.

26. The assembly of claim 19, wherein, for each of the vibration-damping mounts, the notch in an annular notch.

27. A method of mounting a mass storage device comprising:
- attaching a set of vibration-damping mounts to an external surface of a housing of the mass data storage device such that each of the vibration-damping mounts extends in a common direction, wherein each of the vibration-damping mounts includes:
  - a shaft mounted to the external surface of the housing, the shaft including a shaft head opposite the housing, and
  - a vibration-damping base including:
    - a head segment that envelops the shaft head;
    - a neck segment adjacent to the head segment and opposite to the shaft, wherein the neck segment has a cross-sectional thickness smaller than a cross-sectional thickness of the head segment; and
    - a rear segment adjacent to the neck segment and opposite to the head segment, wherein the rear segment has a cross-sectional thickness larger than the cross-sectional thickness of the neck segment,
    - wherein the head segment, the neck segment and the rear segment combine to form a notch configured to mate with a hole in a mounting board; and
- for each of the vibration-damping mounts, forcing the rear segment through a corresponding hole in a set of holes in the mounting board such that at least a portion of the neck segment is within the corresponding hole and the head segment and the rear segment are on either side of the mounting board.

28. The method of claim 27, wherein each of the vibration-damping mounts includes a tail segment adjacent to the rear segment and opposite to the neck segment, wherein the tail segment has a cross-sectional thickness smaller than the cross-sectional thickness of the head segment, wherein the method further comprises positioning each tail segment within the corresponding hole in the mounting board and pulling on the tail segment to pull the rear segment through a corresponding hole.

29. The method of claim 28, wherein the cross-sectional thickness of the rear segment tapers from the notch to the tail segment such that the rear segment is thicker adjacent the notch than adjacent the tail segment.

30. The method of claim 27,
wherein the shafts each include a threaded shaft,
wherein the method further comprises, for each of the vibration-damping mounts, threading the shaft into a screw hole within the housing to mount the vibration-damping mounts to the external surface of the housing of the mass data storage device.

31. The method of claim 27, wherein the set of vibration-damping mounts includes at least three vibration-damping mounts.

32. The method of claim 27, wherein, for each of the vibration-damping mounts, no portion of the shaft extends into the corresponding mounting hole in the mounting board.

33. The method of claim 27, wherein the mass data storage device is a hard disk drive (HDD).

* * * * *